United States Patent Office 2,917,030
Patented Dec. 15, 1959

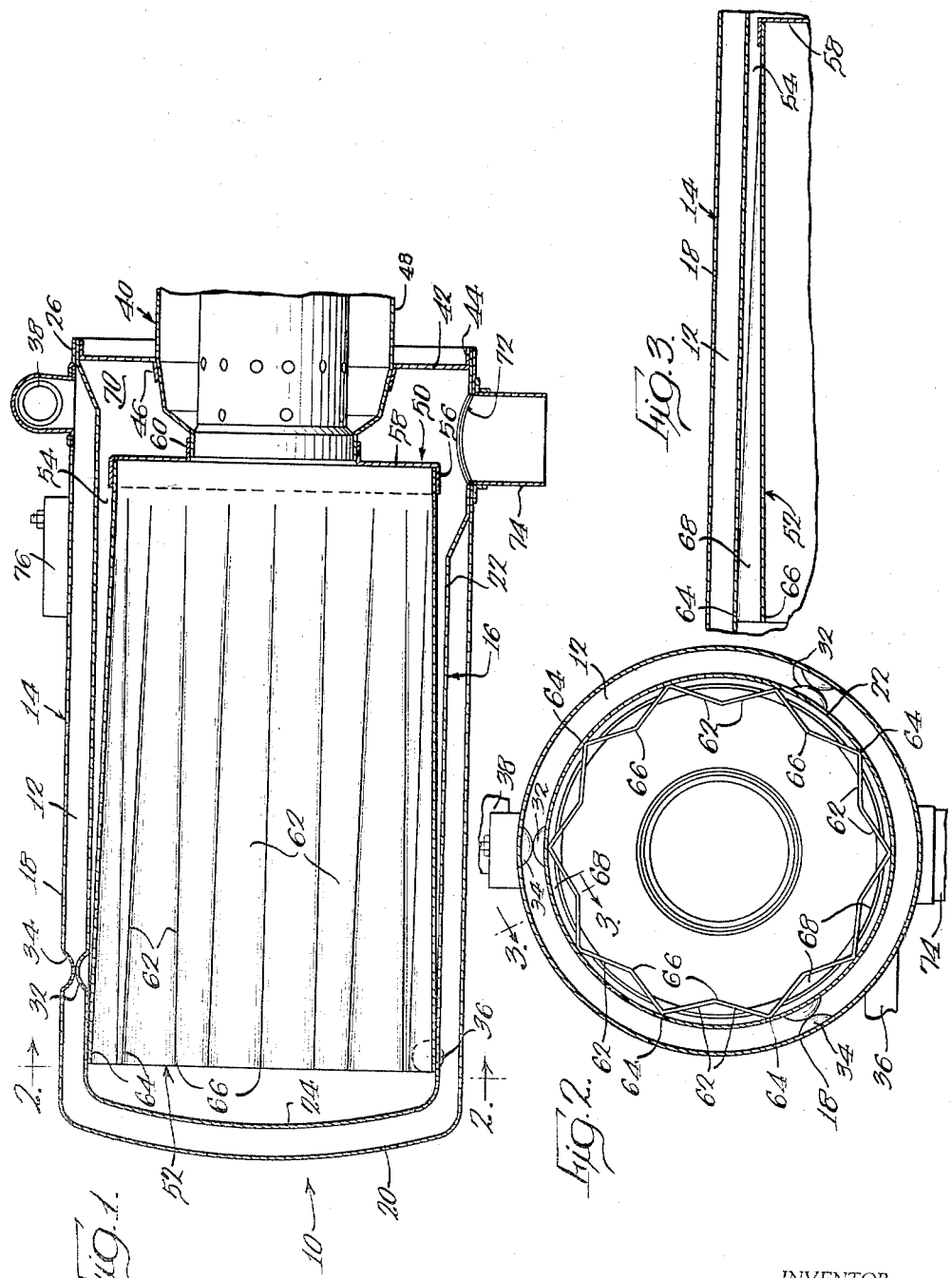

2,917,030

BAFFLED COMBUSTION HEATER

Vernon N. Tramontini, Indianapolis, Ind., assignor to Stewart-Warner Corporation, Chicago, Ill., a corporation of Virginia Application April 10, 1957, Serial No. 651,971

3 Claims. (Cl. 122—149)

The present invention relates to combustion heaters as exemplified by gasoline burning booster heaters which are designed as automotive vehicle accessories adapted to supply auxiliary heat to engine coolant fluid for expediting engine warm-up to normal operating temperatures.

One object of the invention is to provide an improved heater of the above character having a highly simplified and inherently economical construction which is capable of fully and efficiently burning fluid fuel at a rather high rate and efficiently transferring the heat of combustion to surrounding fluid all within remarkably small overall space.

A more specific object is to provide an improved heater, as recited in the previous object, which utilizes improved baffling of economical construction to increase both the efficiency of combustion and the efficiency with which the heat of combustion is transmitted to surrounding fluid. A related object is to provide a baffled heater of this character in which the improved baffling has a highly advantageous shaping that coacts with adjacent heat transfer structure to achieve highly efficient thermal contact between the surface of the heat transfer structure and all the hot combustion gases produced and to firmly support the baffle against vibration in a manner which obviates damaging stresses in the entire structure even though it is subjected to extreme changes in temperature.

Other objects and advantages will become apparent from the following description of the exemplary form of the invention illustrated in the drawings, in which:

Figure 1 is a longitudinal sectional view of a booster heater embodying the invention;

Fig. 2 is a transverse sectional view of the heater taken along the line 2—2 of Fig. 1; and Fig. 3 is a fragmentary sectional view on a slightly reduced scale taken along the line 3—3 of Fig. 2.

The engine coolant fluid of many automotive vehicles (not shown) is used not only for engine cooling but also as a medium for heating the vehicles by rejected engine heat. If this fluid is cold when the engine is started, efficient engine operation and efficient vehicle heating are delayed during the rather substantial period of time ordinarily required for the engine to heat the fluid to normal operating temperatures. This delay can be minimized by the use of a booster heater to supply auxiliary heat to the coolant fluid until it has reached its normal operating temperature at which the fluid becomes an efficient supplier of vehicle heat.

To have practical utility in reducing the time required for the fluid to reach efficient vehicle heating temperatures, a booster heater used for this purpose must be adapted for installation in an automotive vehicle as a component accessory. From this it follows that the cost, the space requirements and the serviceability of the heater are of critical importance. Moreover, the heat output capacity of the heater must be sufficiently high, in relation to the rather high heat rejection of a vehicle engine during warm-up, to accelerate while heating to a degree which warrants the cost of the heater.

The booster heater 10, forming the exemplary embodiment of the invention illustrated in the drawings, is well suited for use as an automotive vehicle accessory adapted to accelerate vehicle heating by supplying auxiliary heat at a high rate to engine coolant fluid which is used as a source of vehicle heat. The coolant fluid is circulated through a thin plenum or heat exchanger chamber 12 formed in the heater 10 between an outer jacket 14 of cylindrical shape and an inner liner 16 of generally similar shape.

The jacket 14 comprises a cylindrical outer shell 18 integral at one end (the left end in Fig. 1) with a transverse outer head 20, which has an outwardly dished shape as shown. The liner 16 comprises a cylindrical inner shell 22 concentric with the outer jacket shell 18 and having a diameter somewhat smaller than that of the outer jacket shell, thus providing between the two a radially thin annular space which forms a part of the plenum chamber 12. The end of the inner shell 22 adjacent the outer jacket head 20 merges integrally with an inner transverse head 24 of the liner 16. The inner liner head 24 is similar in shape to the outer jacket head 20 and has a uniform spacing from the latter which is substantially equal to the radial spacing between the outer jacket shell 18 and the inner liner shell 22. The space between the outer and inner heads 20, 24, also forms a part of the fluid plenum chamber 12.

The peripheral edge of the end of the liner shell 22 remote from the liner head 24 is turned radially outward and firmly secured to the adjacent peripheral end of the outer jacket shell 18 by a fluid tight joint 26 suitably formed by brazing, welding, or the like.

The opposite or head end of the inner liner 16 is supported against radial vibration with respect to the outer jacket 14 by a circumferentially spaced series of protuberances 32 (only one of which appears in Fig. 1) swaged radially outward in the liner shell 22 to firmly engage respectively an opposing series of protuberances 34 swaged radially inward from the jacket shell 18.

Engine coolant fluid is suitably conducted into the thin plenum chamber 12 through a tangential inlet fitting 36 connected into the head end of the outer jacket shell 18. The same fluid is exhausted from the chamber 12 through an outlet fitting 38 connected into the opposite side of the jacket shell 18 adjacent the joint 26. The fluid issuing from the outlet 38 is used for vehicle heating.

In passing through the thin chamber 12, the fluid is heated by heat supplied by a burning fuel mixture projected from a liquid fuel burner 40 longitudinally into the space encircled by the inner liner 16. Only the inner end portion of the burner 40 is illustrated, since the detailed construction of the burner can be readily supplied and varied by those skilled in the art without departing from the scope of the present invention.

Support for the burner 40 is provided by an outer, annular header disc 42 fitted transversely within the end of the liner 16 opposite from the head 24 and having an outer peripheral edge 44 circumferentially joined by brazing, welding, or otherwise to the adjacent marginal edge of the liner. The inner peripheral edge 46 of the header 42 closely encircles and is brazed to the medial portion of an outer shell 48 of the burner 40. Thus supported, the burner 40 protrudes through the header 42 and extends a short distance toward the inner head 24 in concentric relation to the liner shell 22.

The burner 40 projects a burning mixture of fuel and air into the space encircled by the fluid cooled liner shell 22. In this space combustion is consummated with great efficiency at very high temperatures, substantially unaffected by the relatively cool surface of the inner liner 16, and the heat of combustion is efficiently transferred through the liner 16 to the surrounding fluid flowing through the plenum chamber 12.

This is all achieved within strikingly small overall space. While combustion of the fuel mixture is being consummated, the burning gases are largely shielded from the relatively cool liner 16 by economical baffling means 50 which also coacts with the liner to achieve highly efficient thermal contact between the burned combustion gases and the inner surface of the liner.

The baffling means 50 comprises an elongated baffle shell 52 of generally cylindrical shape overall fitted within the liner shell 22 and extending from the burner 40 substantially to the opposite end of the liner shell, where the baffle shell terminates a short distance from the inner head 24. The baffle shell 52 and the liner shell 22 are basically concentric with each other. The burner end of the baffle shell 52 is essentially circular and has a diameter smaller than that of the liner shell 22 by an amount just sufficient to provide around the baffle shell a radially thin, annular exhaust space 54 open toward the outer header 42.

The marginal edge of the baffle shell 52 adjacent the burner 40 is brazed or otherwise secured into a closely encircling cylindrical flange 56 on the outer peripheral edge of an inner header disc 58 forming a part of the baffle means 50. The flanged inner periphery 60 of the header disc 58 encircles and is fixedly attached to the inner end of the burner 40, which provides firm support to the disc 58 and the adjacent end of the baffle shell 52.

The other end of the baffle shell 52, which opposes the liner head 24, is shaped into a circumferentially continuous series of tapered corrugations 62 that extend longitudinally along the baffle shell substantially to the header flange 56. The transverse shaping of the corrugations 62 has its most fundamental form at the extreme end of the baffle shell 52 adjacent the liner head 24. As shown in Fig. 2, successive circumferential portions of the shell forming the corrugations 62 are flattened and turned relative to each other to form a circumferential series of crests 64 protruding radially outward from an intervening series of troughs or flutes 66.

The radial swing or depth of the corrugations 62—that is, the radial displacement with respect to the longitudinal axis of the baffle shell 52 of the radially outward crests 64 from the radially innermost troughs or flutes 66—is a maximum at the head end of the baffle shell 52, Fig. 2. At this extreme end of the baffle shell 52, the crests 64 are displaced radially outward sufficiently to make firm yet slidable abutting contact with the adjacent surface of the liner shell 22.

The portion of each corrugation 62 displaced radially inward from the liner shell 22 forms a longitudinal exhaust passage 68 communicating at one end with the space between the liner head 24 and the adjacent end of the baffle shell 52 and merging at its other end with the annular exhaust space 54 surrounding the burner end of the baffle shell.

From a maximum value at the end of the baffle shell 52 adjacent the liner head 24 the radial swing or depth of the corrugations 62 decreases progressively along the corrugations to a zero value at the opposite end of the corrugations, where the corrugations merge smoothly into the circular, burner end of the baffle shell that continues into the header flange 56.

The exhaust space 54 encircling the burner end of the baffle shell 52 opens into a sizeable annular space 70 encircling the burner 40 between the inner header 58 and the outer header 42. The portion of the liner shell 22 extending longitudinally between the inner header 58 and the outer header 42 and located at the side of the liner shell opposite from the fluid outlet 38 is displaced outward into sealed surface engagement with the adjacent portion of the jacket shell 18 and pierced by a rather large exhaust opening 72. The opening 72 connects the space 70 with the inner end of a radial exhaust duct 74 connected into the jacket shell 18.

Thus it will appear that all but a small fraction of the space encircled by the liner shell 22 is not only made available for high temperature combustion of a burning fuel mixture projected into the space from the burner 40 but also largely protected from cooling by the fluid cooled liner. From the time it leaves the burner 40, the burning fuel and air mixture is completely encircled by the baffle shell 52 until it substantially reaches the liner head 24. By that time combustion is practically complete.

The baffle shell 52 is quickly heated to a very high temperature at which it radiates heat back to the burning gases surrounded by the baffle shell, thus accelerating further the rapidity and completeness of combustion. The stream of hot combustion gases directed against the liner head 24 provides a very efficient transfer of heat through this element to the fluid in the chamber 12.

Upon turning into the exhaust passages 68, the burned combustion gas is thoroughly spread in a rather thin layer against the liner shell 22, the tapered shaping of the corrugations 62 working all the gas into efficient thermal contact with the liner shell surface before the gas reaches the exhaust collecting space of chamber 70.

In moving out of the exhaust collecting chamber 70 into the exhaust duct 74, a portion of the combustion gas flows around the inner end of the burner shell 48 to provide substantial preheating of secondary air flowing through the burner shell to mix with the fuel.

The baffle shell 52 is firmly supported at one end by the inner header 58 and at the other end by the previously mentioned firm engagement of the corrugation crests 64 with the liner shell 22.

Moreover, the support thus provided to the baffle shell 52 obviates damaging stresses in the entire structure due to thermal expansion and contraction. The supporting crests 64 can slide along the inner shell 22 to accommodate differential expansion or contraction of the baffle shell 52 longitudinally. Radial expansion or contraction of the baffle shell 52 in relation to the liner shell 22 is readily compensated for by the inherent flexibility of the corrugations 62.

A temperature responsive control switch 76 is mounted on the jacket 14 and suitably connected electrically to burner control structure (not shown) to control the burner 40 in a manner not necessarily forming a part of the present invention.

While I have shown a preferred embodiment of my invention, it will be apparent that numerous variations and modifications thereof may be made without departing from the underlying principles and scope of the invention. I therefore desire, by the following claims, to include all such variations and modifications by which substantially the results of my invention may be obtained through the use of substantially the same or equivalent means.

I claim:

1. A compact combustion heater for heating engine coolant fluid or the like, comprising, in combination, a thin metal liner including an elongated annular shell and a transverse head closing one end of said shell, a jacket substantially encasing said liner in spaced relation thereto to define therewith a fluid heating chamber encompassing the liner, means defining a fluid inlet into said chamber and means defining a fluid outlet from said chamber, an elongated annular baffle shell disposed within said liner shell in generally concentric relation thereto and extending through the major portion of the length thereof, said baffle shell being shaped to form a circumferential series of longitudinal corrugations extending from the end of the baffle shell adjacent said liner head toward the opposite end of said baffle shell, the end of said baffle shell opposite from said liner head having a relatively smooth peripheral shape in relation to said corrugations and being dimensioned transversely in relation to said liner shell to define therebetween a thin annular exhaust space, said corrugations defining a circumferential series of longitudinal crests extending radially outward and an intervening series of longitudinal flutes displaced radially inward from the adjacent crests, the radial displacement of said crests from the adjacent flutes having a maximum value at the end of said baffle shell adjacent said liner head and decreasing progressively to a substantially zero value near said relatively smooth end of the baffle shell, said baffle shell being dimensioned transversely to place said crests in slidable engagement with the encircling liner shell at the head end of said baffle shell, the space between said flutes and the adjacent liner shell merging with said annular exhaust space encircling said relatively smooth end of said baffle shell, a fluid fuel burner shell mounted at the end of said baffle shell opposite from said liner head, header means forming an impervious annular connection between said burner shell and the adjacent peripheral end of said baffle shell, and exhaust gas collecting and discharge means disposed at the burner end of said liner shell to collect and discharge combustion gas from the adjacent end of said annular space.

2. A compact combustion heater for heating engine coolant fluid or the like, comprising, in combination, an outer jacket including a generally cylindrical jacket shell and a transverse head closing one end of the shell, an inner liner including a generally cylindrical liner shell somewhat smaller in diameter than said jacket shell and a transverse head closing one end of the liner shell, said liner being nested within said jacket with said liner shell and said jacket shell disposed in spaced generally concentric relation to each other and said liner head disposed in spaced opposing relation to said jacket head, the peripheral ends of said liner shell and said jacket shell opposite from said heads being connected together, means forming a fluid inlet into the space between said jacket and said liner, means forming a fluid outlet from said space between said jacket and said liner, an outer header disk extending transversely across the ends of said jacket and liner shells opposite from said heads, a liquid fuel burner shell projecting centrally through said outer header disk toward said liner head, an inner impervious annular header disk encircling the inner end of said burner shell and supported thereon in spaced relation to said outer header disk, a circular elongated baffle shell joined at one end to the outer periphery of said inner header disk and extending through said liner shell to within a short distance of said liner head, the burner end of said baffle shell having a generally smooth circular shape dimensioned diametrically in relation to said liner shell to define therebetween a radially thin exhaust gas space encircling the baffle shell and communicating with the space between said inner and outer header disks, said baffle shell being shaped to form a circumferential series of longitudinal corrugations extending from the end of the baffle shell adjacent said liner head toward the opposite end of the baffle shell, said corrugations having a radial depth which has a maximum value at the end of the baffle shell adjacent said liner head and a progressively decreasing value toward the opposite end of the baffle shell, said corrugations including crests protruding radially outward into contact with the adjacent liner shell at the end of the baffle shell adjacent said liner head, and means defining an exhaust gas opening from the space between said inner and outer header disks.

3. In a booster heater for heating engine coolant fluid for use as a source of vehicle heat, comprising, in combination, a jacket and an elongated liner defining a fluid heating chamber, said liner defining a substantially cylindrical inner surface, a fuel burner shell mounted at one end of said liner, a head closing the other end of said liner, a generally cylindrical baffle connected to the burner shell to receive the burning fuel and products of combustion therefrom, said baffle at the end adjacent the burner being cylindrical and at its opposite end being deeply corrugated, the corrugations at the deeply corrugated end of the baffle being in contact with the inner cylindrical surface of the liner, the corrugations tapering progressively from the deeply corrugated end of the baffle toward the burner end thereof, an exhaust connection for the products of combustion near the burner end of the baffle, and fluid inlet and outlet connections to said heating chamber.

References Cited in the file of this patent

UNITED STATES PATENTS

| | | |
|---|---|---|
| 62,308 | Barden | Feb. 26, 1867 |
| 364,506 | Gilbert | June 7, 1887 |
| 1,734,310 | Taylor | Nov. 5, 1929 |
| 1,862,892 | Haskell | June 14, 1932 |
| 2,448,595 | Holbrook | Sept. 7, 1948 |
| 2,471,833 | McCollum | May 31, 1949 |
| 2,531,459 | Marshall | Nov. 28, 1950 |

FOREIGN PATENTS

| | | |
|---|---|---|
| 341,783 | France | Aug. 19, 1904 |
| 642,878 | Germany | Mar. 18, 1937 |